June 18, 1968     V. R. PYLE ETAL     3,388,610

BRAKE PEDAL LINKAGE

Filed May 31, 1966

INVENTORS:
VAL R. PYLE
RICHARD A. CONRAD.
BY: MALLINCKRODT &
MALLINCKRODT

ATTORNEYS.

¹ United States Patent Office 3,388,610
Patented June 18, 1968

3,388,610
BRAKE PEDAL LINKAGE
Val R. Pyle, 4263 Chegwidden Lane 84107, and Richard A. Conrad, 4156 Olive Circle 84117, both of Salt Lake City, Utah
Filed May 31, 1966, Ser. No. 553,980
3 Claims. (Cl. 74—512)

ABSTRACT OF THE DISCLOSURE

Brake pedal linkage for vehicles having hydraulic brake systems utilizing a master cylinder, whereby the brakes can be effectively actuated with less manual pressure by the operator on the customary foot pedal. This linkage includes a special leverage adaptor and pushrod that can be easily substituted for corresponding parts in conventional brake pedal linkage.

---

This invention relates to linkage systems used to transmit force from a foot pedal to a hydraulic master cylinder in a braking system of a vehicle.

Many automotive vehicles have hydraulic braking systems wherein braking force is exerted by the operator through a second-class lever arrangement. Thus, a brake lever having a foot pedal at one end is pivoted at its other end and one end of a pushrod is pivotally attached to the brake lever intermediate its ends. The other end of the pushrod is adapted to actuate a piston in the usual hydraulic master cylinder. The mechanical advantage of such a system is determined by the location of the connection between the pushrod and the lever—the nearer this connection is to the fulcrum, the greater the mechanical advantage to the user. However, there is a disadvantage in positioning the connection between the pushrod and the brake lever too close to the fulcrum, i.e. the pivotally connected end of the brake lever, since when a smaller distance from fulcrum to connection is used, the pedal at the other end of the brake lever must be swung through a longer arc in order to move the pushrod a given distance. Stock automotive vehicles have the pushrod attached to the brake lever at a point located to enable a typical user to apply sufficient braking pressure to stop the vehicle while pushing the brake pedal through a comfortable arc. While this conventional system is necessary to insure satisfaction of the majority of users, many drivers could operate their automobiles more safely and conveniently if a greater mechanical advantage could be obtained through pushing on the brake pedal.

It is an object of the present invention to provide a simple and inexpensive replacement brake linkage, for the conventional linkage used on most vehicles, that will effectively move the connection between the brake lever and pushrod closer to the fulcrum of the brake lever. This will increase the mechanical advantage afforded an operator who desires to be able to apply an increased pressure through the linkage to the braking system of the vehicle or who desires to be able to actuate the brakes with a smaller pressure application.

To accomplish the above object we employ as principal features of our invention a special leverage adaptor that can be securely attached to the brake lever and that includes an attachment arm for a unique pushrod.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 1:
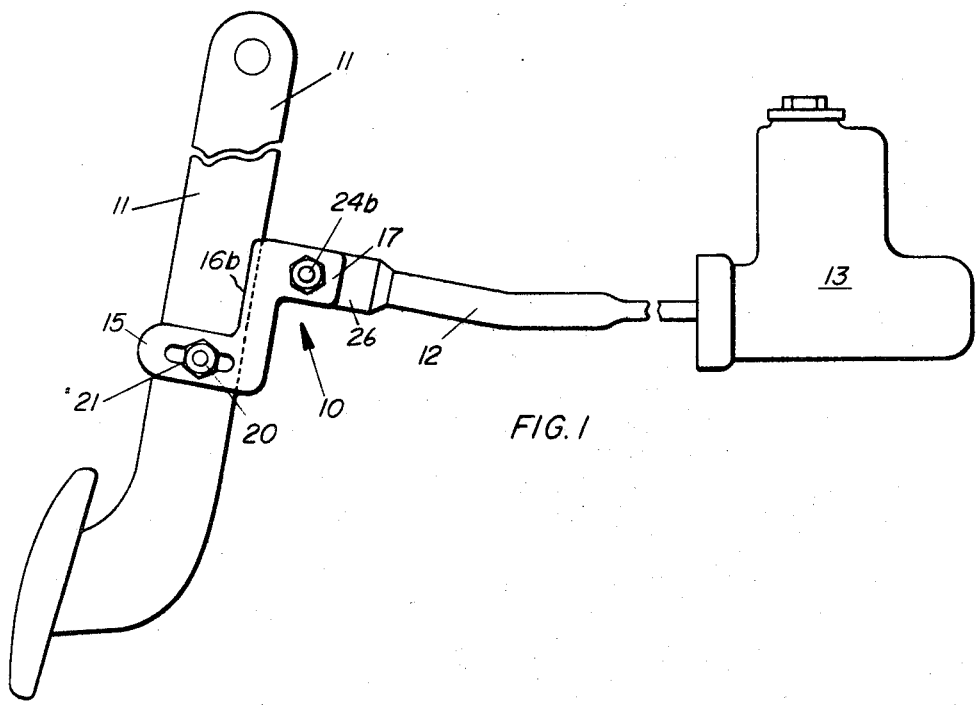
Figure 2:
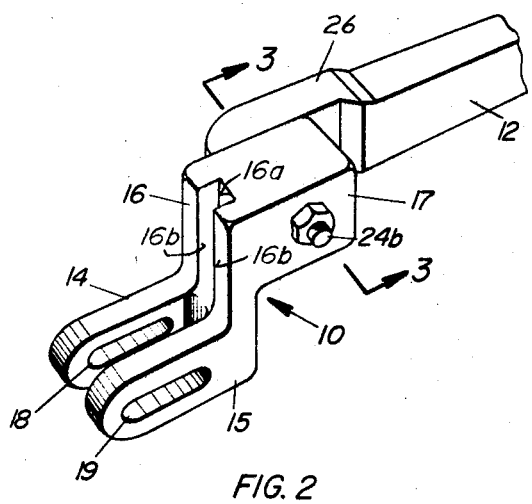
Figure 3:
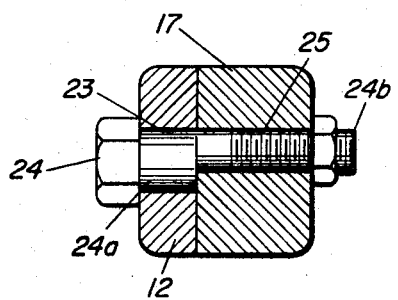

² In the drawings:
FIG. 1 is a side elevation view of the invention, installed between a conventional brake lever and a conventional hydraulic master cylinder;
FIG. 2, a fragmentary perspective view; and
FIG. 3, a vertical sectional view taken on the line 3—3 of FIG. 2.

Referring now to the drawing:
In the illustrated preferred embodiment of the invention a leverage adaptor, shown generally at 10, is connected between a conventional pivotally suspended brake lever 11 and a specially constructed pushrod 12 that is also arranged to actuate the piston (not shown) in a conventional hydraulic brake master cylinder 13.

Leverage adaptor 10 includes a pair of parallel arms 14 and 15 protruding from one face of a web 16 at one end thereof and a single arm 17 protruding from the opposite face of the web and at the other end. Aligned slots 18 and 19 are formed through arms 14 and 15 respectively, so that when the arms are positioned to straddle the brake lever 11 a bolt 20 can be passed through one or the other of the slots 18 or 19, through the hole (not shown) provided in the brake lever for attachment of the usual pushrod or the brake system and through the other of the slots. Because slots 18 and 19 are elongate the adaptor 10 can be used with brake levers of varying dimensions. In positioning the leverage adaptor, web 16 is positioned with its channel back 16a flat against the brake lever and its side flanges 16b overlapping the brake lever. Bolt 20 is inserted through the portions of slots 18 and 19 that are aligned with the hole through the lever. A nut 21 is threaded onto the end of bolt 20 to hold the bolt in place.

Pushrod 12 has a hole 23 therethrough to receive enlarged shoulder portion 24a of the usual brake linkage cam bolt 24. A threaded shank 24b protrudes eccentrically from shoulder 24a and is passed through a hole 25 in the arm 17 that protrudes from web 16. The loose eccentric coupling thus formed between pushrod 12 and arm 17, in conventional manner, insures a short free travel of the brake pedal before any force is applied to the braking system.

Pushrod 12 is curved so that the hole 23 in its off-set end portion 26 will receive the shoulder 24a. The other end of the pushrod is arranged to actuate the piston (not shown) in the master cylinder 13.

With the leverage adaptor 10 positioned on the brake lever 11 and coupled to pushrod 12 the mechanical advantage obtained by pushing on the pedal is much greater than that obtained by pushing on a brake lever to which a pushrod has been connected in the usual manner. Thus, considerably less power is required to operate the brakes of the vehicle on which the brake linkage of the invention is used.

Whereas this invention is here described and illustrated with respect to a certain form thereof, it is to be understood that many variations are possible without departing from the subject matter particularly pointed out in the following claims, which subject matter we regard as our invention.

We claim:
1. A brake pedal linkage for use with a vehicle having a hydraulic brake master cylinder, and a brake lever pivotally connected at one end to said vehicle, a brake actuator pedal on the other end and an attachment hole therebetween, said linkage comprising:
  a leverage adaptor having arms adapted to straddle the brake lever, a web adapted to rest against the brake lever and an arm protruding from said web and offset from the arms adapted to straddle the brake lever;
  a pushrod having one end adapted to actuate the hy- draulic brake master cylinder, a bend near the other end, and offset coupling means on the other end adapted to be coupled to the arm protruding from the web of the leverage adaptor;

means for pivotally interconnecting the offset coupling means of the pushrod and the arm protruding from the web of the leverage adaptor; and means adapted to interconnect the arms adapted to straddle the brake lever and the brake lever at the attachment hole.

2. A brake pedal linkage according to claim 1, wherein the means adapted to interconnect the arms adapted to straddle the brake lever includes an elongate hole in each of the arms, said holes being adapted to be aligned with the attachment hole.

3. A brake pedal linkage according to claim 1, wherein the web of the leverage adaptor includes side flanges adapted to straddle the brake lever.

References Cited

UNITED STATES PATENTS

| | | | |
|---|---|---|---|
| 1,453,386 | 9/1922 | Ewell | 74—512 |
| 3,027,778 | 4/1962 | Risnes | 74—512 |

FRED C. MATTERN, Jr., *Primary Examiner.*

J. S. CORNETTE, *Assistant Examiner.*